C. W. TALCOTT.
FIRE EXTINGUISHER.

No. 253,128. Patented Jan. 31, 1882.

Witnesses:
Geo. S. Bramwell
Chas. Allen Taber

Inventor:
Charles W. Talcott
By his Attorney,
Francis W. Bartlett

UNITED STATES PATENT OFFICE.

CHARLES W. TALCOTT, OF WOONSOCKET, RHODE ISLAND.

FIRE-EXTINGUISHER.

SPECIFICATION forming part of Letters Patent No. 253,128, dated January 31, 1882.

Application filed April 8, 1879.

*To all whom it may concern:*

Be it known that I, CHARLES W. TALCOTT, of Woonsocket, in the State of Rhode Island, have invented a new and useful Improvement in Fire-Extinguishers for Extinguishing Fire in the Interior of Buildings, which invention I will describe as follows, reference being made to the accompanying drawings, which form a part of this specification, like letters indicating like parts in the different figures thereof.

My invention consists in a metal cap or cover fitting over the perforated rose hereinafter described, or fitted upon any similar fire-extinguishing device, and in combination with said device, said cap to be provided with a metal fastening-pin, which pin shall be fusible at a comparatively low degree of heat. There is also a suitable annular-shaped packing upon which said cap rests when closed, in order to secure a perfect joint. The said cap swings on and off of said rose by means of an ordinary hinge or similar device.

Figure 1:
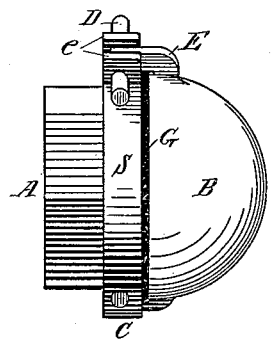
Figure 2:
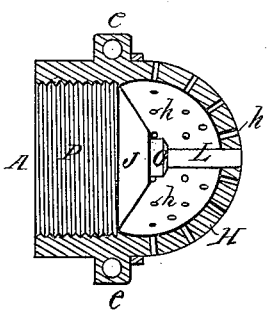
Figure 3:
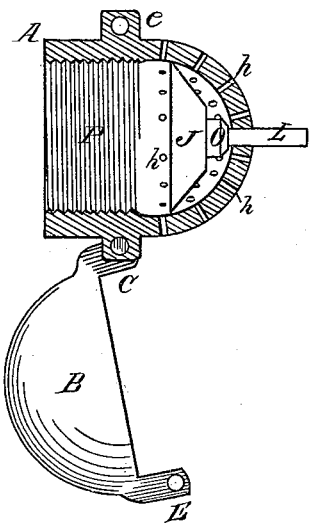
Figure 4:
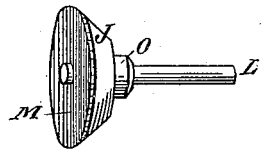

Figure 1 of the drawings shows the extinguisher closed and in condition for use. Fig. 2 shows a sectional view of a rose, H, made of iron or any other suitable material, with perforations h, which perforations are about one-twelfth of an inch in diameter and situated near together and at equal distances apart over the entire surface of the rose. In Fig. 3 of the drawings is illustrated a valve, J, with valve-guide L and shoulder O; and Fig. 4 shows said valve in full, with guide L and shoulder O, with a piece of packing of rubber or other suitable material, M, cut in the shape of and placed upon the valve-seat, as shown. In Fig. 2 the valve is seen in its closed position, being the position it occupies when the appliance is not in operation. The valve-guide L is shown in Fig. 2 with the end thereof inserted in an opening or hole in the rose, said opening occupying such position that if a line be drawn through the center of the rose longitudinally said line would pass through the center of said opening. Examination of Fig. 2 shows also that the end of the valve-guide L, when the valve is closed, which is its position as shown in this figure, is just flush with the outside surface of the rose. The opening above described must be of a diameter just sufficient to allow the valve-guide L to move to and fro therein without unnecessary friction. The guide L must be of a diameter proportionate to the size of the valve, and the valve must of course be of a size proportionate to that of the rose used. When the valve J is closed the packing M fits closely in the groove formed just above the thread P, and when the coupling of the water-pipe is inserted by means of the thread P the end of the said pipe or coupling will bear against the edge of the packing M throughout its entire circumference. By this means a joint is effected to prevent leakage from the water-pipe when the valve is closed.

B represents a cover, attached to the rose at the point C, and moving by means of an ordinary hinge placed at that point. This cover is made in the same shape as the rose, so that when the cover is closed the inside surface of the same shall meet the outside surface of the rose at every point—in short, that the cover shall shut tightly and evenly over the face of the rose.

G represents an annular packing, of rubber or other suitable material, of ordinary and proper thickness, placed around the outside of the rose at its base, and bearing and resting upon the shoulder S, which forms the base of the rose H, and is situated between the rose and the thread by which the rose is coupled to the pipe, by which shoulder the cover B is supported when closed. By the use of this packing, when the cover B is closed, as shown in Fig. 1, a perfect joint is effected around the base of the rose. The shoulder S is cast so as to turn outward at two points and form the two projections illustrated by e, these projections to be just far enough apart to admit of the knob E being inserted between them, the knob E and the two projections e being cast with holes about one-eighth of an inch in diameter, so that when the cover B is closed over the rose H and shut closely down upon the packing G the hole in the knob E shall be exactly opposite those in the two projections e, and thus all these openings will be exactly in line with each other. A pin of any metal or combination metal fusible at a comparatively low degree of heat (shown by D in Fig. 1) is driven completely through the holes in the projections e and knob E, fastening the cover B firmly and strongly in its closed position, as shown in Fig. 1.

A, Fig. 1, simply represents the point of contact of the rose with the pipe, the rose being coupled thereto by means of a thread, as before described.

The valve J being closed, and the end of the valve-guide L being brought to a point exactly flush with the outside surface of the rose, as before described, the cover B may then be closed over the rose and fastened in its proper position by driving the fusible pin D into its position through the openings e, E, and e, respectively, as hereinbefore described, and shown in Fig. 1 of the drawings.

The operation of my invention, in case of fire in a building wherein it is placed, is substantially as follows: The heat from the flames melts the fusible pin D, which holds the cap B in its closed position, and instantly the pressure of water in the pipe raises the valve J. The valve-guide L moves out through the opening in the end of the rose and throws the cap B open upon its hinge placed at the point C. The valve J, passing by those of the perforations h situated nearest the base of the rose, liberates these perforations, and the shoulder O, striking and bearing against the inside of the wall of the rose, near the top of said rose, liberates the balance of said perforations h, all of which is shown by Fig. 3 of the drawings. The water is then emitted freely from all the perforations.

Examination of the drawings shows that the end of the valve-guide L, pressing as it does exactly at the central point of the inside surface of the cover B, when said cover is closed and secured by means of the pin D, causes the pressure of the water in the pipe to bear equally upon the pin D and upon the hinge at the point C; and it is obvious that by such construction the danger of accidental inundation is much less than in case the entire pressure of the water in the pipe were brought to bear upon the pin D.

What I claim as my invention, and desire to secure by Letters Patent, is—

1. The combination, with a distributer designed to spread water or other fluid over a large area, of a hinged metal cap arranged to cover and protect the distributer, substantially as described.

2. The combination, with a distributer designed to spread water or other fluid over a large area, of a hinged metal cap arranged to cover and protect the distributer, said cap being secured to its base with a low fusible material, substantially as described.

3. The combination, with a distributer designed to spread water or other fluid over a large area, of a hinged metal cap arranged to cover and protect the distributer, and fastened to the base with a pin made of a low fusible material, substantially as described.

4. The combination, with a distributer designed to spread water or other fluid over a large area, of a hinged metal cap arranged to cover and protect the distributer, and fastened to the base with a pin made of low fusible material, and a packing-annulus, substantially as described.

5. The combination, with the base provided with projections or ears, and a distributer designed to spread water or other fluid over a large area, of a hinged metal cap arranged to cover and protect the distributer, and fastened to said base with a pin made of low fusible material, substantially as described.

6. The combination, with a perforated distributer, of a cap closely fitting over the perforated portion of the distributer, and secured by solder fusible at a low temperature, substantially as described.

7. The combination, with a distributer, of a cap extending over the distributer to protect the same, and held to a flange or shoulder by fusible solder, and a seal placed between the distributer and the fusible solder, so as to prevent the water from reaching the solder joint, substantially as described.

CHARLES W. TALCOTT.

Witnesses:
CHAS. ALLEN TABER,
FRANCIS M. BOUTWELL.